(12) United States Patent
Bloch et al.

(10) Patent No.: US 8,705,349 B2
(45) Date of Patent: Apr. 22, 2014

(54) DESTINATION-BASED CONGESTION CONTROL

(75) Inventors: Noam Bloch, Bat Shlomo (IL); Eitan Zahavi, Zichron Yaakov (IL)

(73) Assignee: Mellanox Technologies Ltd., Yokneam (IL)

( * ) Notice: Subject to any disclaimer, the term of this patent is extended or adjusted under 35 U.S.C. 154(b) by 142 days.

(21) Appl. No.: 13/304,654

(22) Filed: Nov. 27, 2011

(65) Prior Publication Data

US 2013/0135999 A1 May 30, 2013

(51) Int. Cl.
*H04L 12/26* (2006.01)

(52) U.S. Cl.
USPC .......................................... 370/229; 370/231

(58) Field of Classification Search
USPC ......... 370/229, 231, 232, 235, 242, 248, 252, 370/253
See application file for complete search history.

(56) References Cited

U.S. PATENT DOCUMENTS

| | | | | |
|---|---|---|---|---|
| 5,400,329 | A * | 3/1995 | Tokura et al. | 370/232 |
| 7,000,025 | B1 * | 2/2006 | Wilson | 709/235 |
| 7,200,116 | B2 * | 4/2007 | Kobayashi | 370/237 |
| 7,602,712 | B2 * | 10/2009 | Johnsen et al. | 370/231 |

OTHER PUBLICATIONS

IEEE Standard 802.1Qau, "IEEE Standard for Local and Metropolitan Area Networks—Virtual Bridged Local Area Networks; Amendment 13: Congestion Notification", Apr. 23, 2010.
Infiniband Trade Association, "Infiniband Architecture Specification", vol. 1, release 1.2.1, Annex A10, pp. 1650-1697, Nov. 2007.
IEEE, 802.3 "Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications Corrigendum 1: Timing Considerations for Pause Operation, David J. Law et al, Jan. 2009.
Desanti, C., "802.1Qbb—IEEE Standard for Local and Metropolitan Area Networks—Virtual Bridged Local Area Networks—Amendment: Priority-based Flow Control", Sep. 14, 2008.

* cited by examiner

*Primary Examiner* — Brenda H Pham
(74) *Attorney, Agent, or Firm* — D. Kligler I.P. Services Ltd.

(57) ABSTRACT

A method for communication includes sending communication packets over a network from a first network interface. A notification, which originates from a second network interface and indicates a network congestion encountered by one or more of the packets, is received in the first network interface. A network address of the second network interface is identified based on the notification. A transmission rate of subsequent packets addressed to the network address is regulated responsively to the notification, irrespective of a transport service instance on which the subsequent packets are sent from the first network interface.

12 Claims, 2 Drawing Sheets

DESTINATION-BASED CONGESTION CONTROL

FIELD OF THE INVENTION

The present invention relates generally to communication networks, and particularly to methods and systems for congestion control.

BACKGROUND OF THE INVENTION

Some communication networks apply congestion control mechanisms for mitigating traffic congestion in the network. For example, congestion control for Infiniband™ networks is specified in "InfiniBand Architecture Specification Volume 1," release 1.2.1, Annex A10, November, 2007, pages 1650-1697, which is incorporated herein by reference. As another example, congestion control for Ethernet™ networks is specified in IEEE Standard 802.1Qau-2010, entitled "IEEE Standard for Local and Metropolitan Area Networks—Virtual Bridged Local Area Networks; Amendment 13: Congestion Notification," Apr. 23, 2010, which is incorporated herein by reference.

SUMMARY OF THE INVENTION

An embodiment of the present invention that is described herein provides a method for communication. The method includes sending communication packets over a network from a first network interface. A notification, which originates from a second network interface and indicates a network congestion encountered by one or more of the packets, is received in the first network interface. A network address of the second network interface is identified based on the notification. A transmission rate of subsequent packets addressed to the network address is regulated responsively to the notification, irrespective of a transport service instance on which the subsequent packets are sent from the first network interface.

In some embodiments, the notification indicates that the network congestion is encountered by the packets sent on a first transport service instance in the first network interface, and regulating the transmission rate includes controlling the transmission rate of one or more subsequent packets that are addressed to the network address and are sent on a second transport service instance in the first network interface, different from the first transport service instance. Controlling the transmission rate may include initiating regulation of the transmission rate of the subsequent packets that are sent on a second transport service instance before receiving another notification of the network congestion encountered by the packets sent on the second transport service instance.

In a disclosed embodiment, regulating the transmission rate includes, on a given transport service instance, regulating the transmission rate of the subsequent packets that are addressed to the network address, while refraining from regulating the transmission rate of the subsequent packets that are not addressed to the network address. In an embodiment, the transport service instance includes an Infiniband Queue Pair (QP). In another embodiment, sending the communication packets includes sending Infiniband Unreliable Datagram (UD) packets.

In an embodiment, identifying the network address of the second network interface includes extracting a source address from the notification. In another embodiment, regulating the transmission rate includes allocating a rate limiting circuit, from a pool of rate limiting circuits, to force a minimum delay between successive packets addressed to the network address. Allocating the rate limiting circuit may include causing the rate limiting circuit to apply the minimum delay to packets sent on multiple different transport service instances in the first network interface. In an embodiment, allocating the rate limiting circuit includes assigning the rate limiting circuit to regulate a subset of the successive packets that are addressed to the network address and are associated with a given service level.

In an example embodiment, the network address includes a Destination Local Identifier (DLID) of the second network interface. In another embodiment, the network address includes a Global Identifier (GID) of the second network interface.

There is additionally provided, in accordance with an embodiment of the present invention, a network interface that includes one or more transport service instances and congestion control circuitry. The transport service instances are configured to send communication packets over a network, and to receive from the network a notification that originates from a remote network node and indicates a network congestion encountered by one or more of the packets. The congestion control circuitry is configured to identify, based on the notification, a network address of the remote network node, and to regulate responsively to the notification a transmission rate of subsequent packets that are addressed to the network address, irrespective of a transport service instance over which the subsequent packets are sent from the network interface.

There is also provided, in accordance with an embodiment of the present invention, a computer software product for communication, the product including a tangible non-transitory computer-readable medium, in which program instructions are stored, which instructions, when read by a computer, cause the computer to send communication packets over a network from a first network interface, to receive in the first network interface a notification, which originates from a second network interface and indicates a network congestion encountered by one or more of the packets, to identify, based on the notification, a network address of the second network interface, and, responsively to the notification, to regulate a transmission rate of subsequent packets that are addressed to the network address, irrespective of a transport service instance on which the subsequent packets are sent from the first network interface.

There is further provided, in accordance with an embodiment of the present invention, a method for communication. The method includes holding a congestion control configuration, which instructs a first network interface to send communication packets over a network, to receive a notification that originates from a second network interface and indicates a network congestion encountered by one or more of the packets, to identify, based on the notification, a network address of the second network interface, and, responsively to the notification, to regulate a transmission rate of subsequent packets that are addressed to the network address, irrespective of a transport service instance on which the subsequent packets are sent from the first network interface. The first network interface is configured over the network to apply the congestion control configuration.

The present invention will be more fully understood from the following detailed description of the embodiments thereof, taken together with the drawings in which:

DETAILED DESCRIPTION OF EMBODIMENTS

Overview

Embodiments of the present invention that are described hereinbelow provide improved methods and systems for congestion control in communication networks. In some embodiments, a source network interface (e.g., an Infiniband Host Channel Adapter—HCA) sends communication packets to a destination network interface over a communication network. If an intermediate network element detects packets that are subject to network congestion (e.g., traverse a congested queue), the network element marks these packets with suitable congestion indications. The destination network interface receives the marked packets and, upon detecting the congestion indications, sends a notification back to the source network interface. In response to the notification, the source network interface regulates the transmission rate of subsequent packets in an attempt to mitigate the congestion.

In some embodiments that are described herein, the source network interface regulates the transmission rate of the subsequent packets selectively, based on destination address. In these embodiments, the source network interface identifies the destination address of the packets that were marked by the network element and thus triggered the notification. The destination address may be identified, for example, by extracting the source address of the notification. The source network interface then regulates the transmission rate of subsequent packets that are addressed to the identified destination address, e.g., by forcing a certain inter-packet delay between successive packets.

By regulating the packet transmission rate per destination address, the source network interface is able to mitigate network congestion effectively with little impact on packets that do not contribute to the congestion. Other possible solutions could be to regulate the packet transmission rate per send queue (for network interfaces having multiple send queues) or per service level. As explained in detail hereinbelow, such solutions are either sub-optimal in their ability to mitigate the congestion, or unnecessarily reduce the transmission rate of packet flows that do not contribute to the congestion.

Regulation per destination address, on the other hand, provides a highly effective performance trade-off in comparison with other possible solutions. In Infiniband networks, for example, regulation per destination address is highly efficient in the Unreliable Datagram (UD) transport type, in which a single Queue Pair (QP) is used for sending packets to multiple destinations.

System Description

Figure 1:
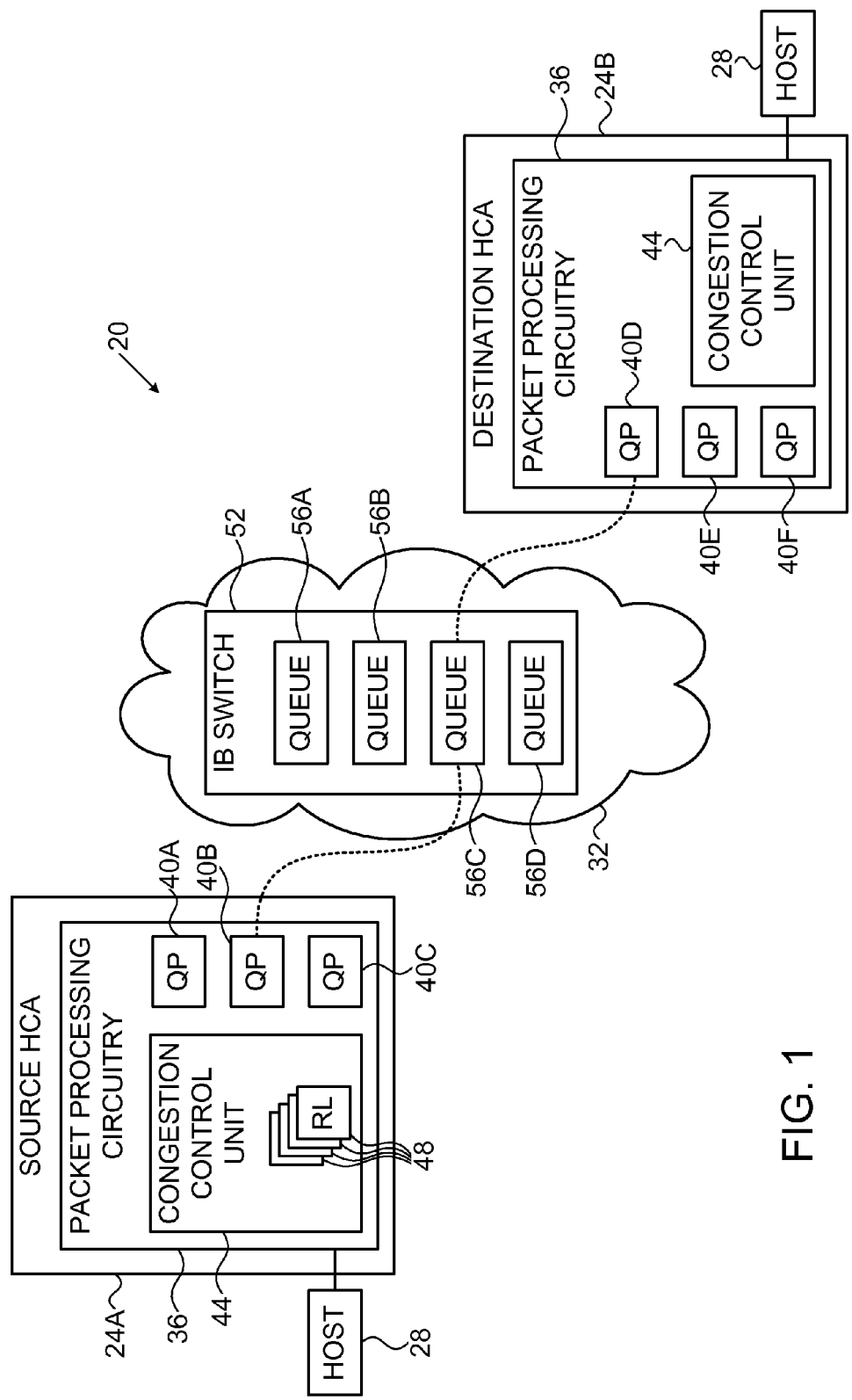
FIG. 1 is a block diagram that schematically illustrates a communication system, in accordance with an embodiment of the present invention.

FIG. 1 is a block diagram that schematically illustrates a communication system 20, in accordance with an embodiment of the present invention. In the present example, system 20 comprises an Infiniband (IB) system in which two Host channel Adapters (HCAs) 24A and 24B communicate over an IB network 32. In alternative embodiments, system 20 may comprise any other suitable network type in which network interfaces (e.g., Network Interface Cards—NICs) communicate with one another.

Each HCA is connected to a respective host 28, such as a computer. The figure shows only two HCAs for the sake of clarity. Real-life systems, however, may comprise a large number of hosts and HCAs. Each HCA comprises packet processing circuitry 36, which sends and receives IB communication packets so as to communicate between hosts 28. Circuitry 36 comprises one or more Queue Pairs (QPs) 40, often multiple QPs. Each QP comprises a Send Queue and a Receive Queue (SQ, RQ—not shown in the figure). In a given QP, the SQ queues packets that are pending for transmission from the HCA to network 32, and the RQ queues packets that were received from the network and are pending for decoding in the HCA. (In the present context, each QPs is regarded as a kind of transport service instance that is used for sending and receiving packets over the network. In alternative embodiments, other suitable types of transport service instances can be used.)

Each HCA comprises a congestion control unit 44, which takes measures for mitigating congestion of packets in network 32. Unit 44 comprises a pool of multiple Rate Limiters (RLs) 48 that regulate the transmission rate of packets. The congestion control methods applied by unit 44 are described in detail further below.

The example of FIG. 1 refers to packet transmission from HCA 24A to HCA 24B. Thus, HCAs 24A and 24B are referred to as a source HCA and a destination HCA, respectively. This reference, however, is made purely for the sake of clarity. Typically, each HCA may function as a source HCA for some packets and as a destination HCA for other packets. A given HCA may send packets to multiple HCAs and may receive packets from multiple HCAs. RLs 48 are shown in the figure only for HCA 24A for the sake of clarity, although HCA 24B typically comprises a pool of RLs, as well.

Packets that are sent from HCA 24A to HCA 24B may traverse various network elements in network 32. In the present example, the packets traverse a certain path in the network that passes through an IB switch 52. Switch comprises multiple queues that queue the packets traversing the switch, in the present example four queues 56A . . . 56D. In alternative embodiments, the packets may traverse various paths that may each pass through multiple network elements.

The HCA, switch and system configurations shown in FIG. 1 are example configurations, which are chosen purely for the sake of conceptual clarity. In alternative embodiments, any other suitable HCA, network element and system configurations can be used. Certain elements of HCAs 24A and 24B may be implemented using hardware, such as using one or more Application-Specific Integrated Circuits (ASICs) or Field-Programmable Gate Arrays (FPGAs). Alternatively, some HCA elements may be implemented in software or using a combination of hardware and software elements.

In some embodiments, certain HCA functions may be implemented using a general-purpose computer, which is programmed in software to carry out the functions described herein. In one example embodiment, such functions may be performed by a processor of host 28. The software may be downloaded to the computer in electronic form, over a network, for example, or it may, alternatively or additionally, be provided and/or stored on non-transitory tangible media, such as magnetic, optical, or electronic memory.

Congestion Control Using FECN and CNP/BECN

In some practical cases, certain components of the network elements in network 32 are loaded with heavy traffic and may cause large delays or even packet loss. In the example of FIG. 1, one or more of queues 56A . . . 56D of switch 52 may be loaded with a large volume of packets. Such scenarios are referred to herein as network congestion. In some embodiments, HCAs 24A and 24B and switch 32 apply a congestion control scheme that mitigates network congestion.

In some embodiments, the network elements in network 32 monitor their internal queues. When a network element (e.g., switch 52) identifies a congested queue, the network element marks the packets passing through the congested queue by setting a Forward Explicit Congestion Notification (FECN) bit in the packet header. When a packet sent from a source HCA reaches its destination HCA, the destination HCA examines the FECN bit and thus identifies the network congestion.

In some embodiments, upon identifying the network congestion, the destination HCA sends a Congestion Notification Packet (CNP) to the source HCA. The CNP serves as a notification, which indicates to the source HCA that the packet in question was subject to network congestion. The source HCA typically responds to the CNP by regulating (e.g., reducing) the transmission rate of subsequent packets. The source HCA may regulate the transmission rate selectively, i.e., only for a subset of the subsequent packets that meet a certain criterion.

In alternative embodiments, upon identifying the network congestion, the destination HCA sets a Backward Explicit Congestion Notification (BECN) bit in the packet header of a packet (typically an acknowledgement packet) that it sends to the source HCA. The BECN bit serves as a notification that indicates to the source HCA that the forward packet (marked with FECN) was subject to network congestion. The source HCA may respond to the BECN bit of the acknowledgement packet by regulating the transmission rate of subsequent packets. Although the description that follows refers mainly to CNP, the disclosed techniques can be used with any suitable notification that indicates congestion, such as BECN.

In the example of FIG. 1, HCA 24A sends packets to HCA 24B from QP 40B, and these packets pass through queue 56C of switch 52. If queue 56C becomes congested, switch marks the packets traversing the queue by setting their FECN bit. HCA 24B receives the marked packets via QP 40D, and responds by sending a CNP to HCA 24A.

When responding to a CNP, it is possible in principle for the source HCA to reduce the transmission rate of subsequent packets at various granularities and according to various policies. For example, the source HCA may reduce the transmission rate of all subsequent packets that are sent via the same QP (or other transport service instance) as the packets that were marked by the switch. Another possible solution would be for the source HCA to reduce the transmission rate for all packets having the same Service Level (SL) as the packets that were marked by the switch.

Regulating the transmission rate per QP is sub-optimal for several reasons. For example, the source HCA may send packets to the destination HCA via more than one QP. In order to mitigate the congestion effectively, the destination HCA may need to generate CNPs for all or at least most of these QPs. Moreover, in some IB transport types (e.g., Unreliable Datagram—UD) a single SQ (and thus a single QP) is used for sending packets to multiple destination HCAs. In such cases, regulating the transmission rate per QP will unnecessarily reduce the transmission rate for packet flows that do not traverse the congestion point. Regulating the transmission rate per Service Level (SL) is also sub-optimal, for example because it reduces the transmission rate for multiple flows, some of which may not traverse the congestion point at all.

Congestion Control per Destination Address

In some embodiments of the present invention, congestion control unit 44 in source HCA 24A regulates the transmission rate of subsequent packets based on destination address. In these embodiments, unit 44 determines the destination address of the packets that were marked by switch 52 and triggered the CNP (these packets are referred to as "marked packets" for brevity). Having determined the destination address of the marked packets, unit 44 reduces the transmission rate of subsequent packets addressed to this address.

The term "destination address" may refer, for example, to any suitable layer-2 network address to which the packets are addressed. In IB networks, for example, the destination address may comprise a Destination Local Identifier (Destination LID or DLID). In another example embodiment, the destination address may comprise an IB Global Identifier (GID).

Since the CNP is sent from the destination HCA in response to receiving the marked packets, the source address appearing in the CNP is typically equal to the destination address of the marked packets. Thus, in an embodiment, unit 44 of the source HCA identifies the destination address of the marked packets by extracting the source address from the CNP. Alternatively, unit 44 may identify the destination address of the marked packets in any other suitable way.

In some embodiments, unit 44 regulates the transmission rate of the packets addressed to a certain destination address by forcing a certain minimum inter-packet delay between successive packets sent to this destination address. In an embodiment, each rate limiter 48 can be associated with a certain destination address, and enforce a minimum inter-packet delays on the packets addressed to that destination address. Each rate limiter 48 may be assigned by unit 44 to a certain destination address, and may be configured with certain parameters (e.g., the desired minimum inter-packet delay or the time duration over which rate regulation is to be applied).

In a typical embodiment, when a CNP arrives at the source HCA from a certain destination address, unit 44 checks whether a rate limiter is already assigned to this destination address. If so, unit 44 may update its parameters. Otherwise, unit 44 allocates a rate limiter from the pool to the destination address in question. The rate limiter regulates the transmission rate of subsequent packets that are addressed to its designated destination address.

In alternative embodiments, unit 44 may assign and associate a rate limiter to a respective combination of destination address and other packet attribute or attributes. In an example embodiment, unit 44 assigns rate limiters to pairs of {destination address, SL}, wherein SL denotes the service level of the outgoing packets. This mechanism enables unit 44 in the source HCA to regulate the packet transmission rate with a fine granularity, which distinguishes between different service level packets destined to the same destination address.

Note that unit 44 regulates the packet transmission rate irrespective of QP (or other type of transport service instance). In other words, if unit 44 decides to regulate the transmission rate of packets addressed to a certain destination address, the allocated rate limiter 48 will enforce inter-packet delays regardless of the QP (or QPs) used for sending the packets. Thus, for example, the source HCA may send packets to a certain destination address via multiple QPs, and regulate the overall transmission rate of the packets to that destination address, taken over all used QPs.

Typically, the CNP indicates the source QP of the marked packets, i.e., the QP of the source HCA that was used for sending the marked packets that triggered the CNP. Nevertheless, in response to the CNP, unit 44 will regulate the transmission rate of subsequent packets to the destination address, whether they are sent via the same source QP or via a different QP.

In some embodiments, source HCA 24A sends packets to destination HCA 24B over two or more QPs (selected from QPs 40A ... 40C). In these embodiments, unit 44 may receive from HCA 24B a CNP that indicates congestion that is encountered by packets sent over one QP (e.g., QP 40A). In response to this CNP, unit 44 may regulate the transmission rate of packets that are sent to HCA 24B over one or more other QPs. In an embodiment, unit 44 initiates the regulation of transmission rate on the other QPs before receiving another CNP indicating congestion on any of the other QPs.

Figure 2:
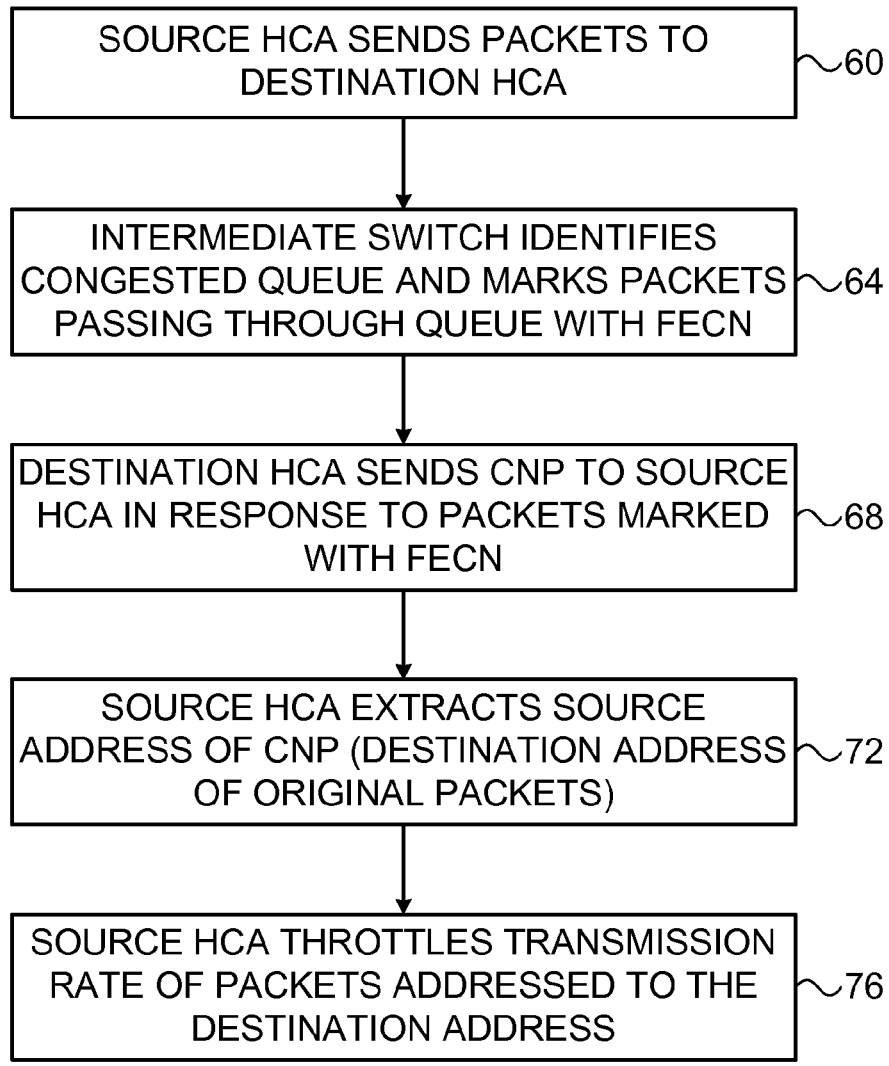
FIG. 2 is a flow chart that schematically illustrates a method for congestion control, in accordance with an embodiment of the present invention.

FIG. 2 is a flow chart that schematically illustrates a method for congestion control, in accordance with an embodiment of the present invention. The method begins with source HCA 24A sending communication packets to destination HCA 24B via one or more QPs, at a packet transmission step 60. In the present example, the packets traverse a certain congested queue in an intermediate switch (e.g., queue 56C in switch 52).

Switch 52 identifies the congested queue and marks the packets passing through this queue by setting their FECN bit, at a congestion marking step 64. Destination HCA 24B receives the marked packets and detects the set FECN bits. In response to detecting the marked packets, destination HCA 24B sends a CNP to source HCA 24A, at a congestion notification step 68. The CNP serves as a notification that indicates the congestion to the source HCA. (As noted above, in alternative embodiments the notification may comprise a BECN bit in an acknowledgement packet sent from destination HCA 24B to source HCA 24A.)

Upon receiving the CNP via one of the QPs of source HCA 24A, congestion control unit 44 in the source HCA identifies the destination address of the marked packets that triggered the CNP, at a destination identification step 72. In the present example, unit 44 extracts the source address of the CNP and regards the extracted address as the destination address of the marked packets. Unit 44 then throttles the transmission rate of subsequent packets addressed to the identified destination address, e.g., by allocating and applying a rate limiter 48, at a rate regulation step 76. Regulating the transmission rate helps to reduce or eliminate the congestion.

In the embodiments described herein, the congestion notification is sent to the source network interface from the destination network interface. Generally speaking, however, the congestion notification may originate from any suitable network node, such as from the network switch that identified the congestion.

In some embodiments, the source HCA is configured by a network management system (not shown in the figures) to apply the congestion control methods described herein. In a typical implementation, the network management system holds a congestion control configuration that defines the congestion control to be applied by the source HCA. The configuration may comprise, for example, various parameters relating to regulating the packet transmission rate. The network management system configures the source HCA, over network 32, to apply the congestion control configuration. This functionality may be implemented, for example, as part of an Infiniband Subnet Manager (SM).

Although the embodiments described herein mainly address InfiniBand networks, the methods and systems described herein can also be used in other applications, such as in Ethernet.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
sending communication packets over a network from a first network interface;
receiving in the first network interface a notification, which originates from a second network interface and indicates a network congestion encountered by one or more of the packets;
identifying a network address of the second network interface by extracting a source address from the notification; and
responsively to the notification, regulating a transmission rate of subsequent packets that are addressed to the network address, irrespective of a transport service instance on which the subsequent packets are sent from the first network interface,
wherein the notification indicates that the network congestion is encountered by the packets sent on a first transport service instance in the first network interface, and wherein regulating the transmission rate comprises controlling the transmission rate of one or more subsequent packets that are addressed to the network address and are sent on a second transport service instance in the first network interface, different from the first transport service instance.

2. The method according to claim 1, wherein controlling the transmission rate comprises initiating regulation of the transmission rate of the subsequent packets that are sent on a second transport service instance before receiving another notification of the network congestion encountered by the packets sent on the second transport service instance.

3. A method for communication, comprising:
sending communication packets over a network from a first network interface;
receiving in the first network interface a notification, which originates from a second network interface and indicates a network congestion encountered by one or more of the packets;
identifying a network address of the second network interface by extracting a source address from the notification; and
responsively to the notification, regulating a transmission rate of subsequent packets that are addressed to the network address, irrespective of a transport service instance on which the subsequent packets are sent from the first network interface,
wherein regulating the transmission rate comprises, on a given transport service instance, regulating the transmission rate of the subsequent packets that are addressed to the network address, while refraining from regulating the transmission rate of the subsequent packets that are not addressed to the network address.

4. A method for communication, comprising:
sending communication packets over a network from a first network interface;
receiving in the first network interface a notification, which originates from a second network interface and indicates a network congestion encountered by one or more of the packets;
identifying a network address of the second network interface by extracting a source address from the notification; and
responsively to the notification, regulating a transmission rate of subsequent packets that are addressed to the network address, irrespective of a transport service instance on which the subsequent packets are sent from the first network interface,
wherein regulating the transmission rate comprises allocating a rate limiting circuit, from a pool of rate limiting circuits, to force a minimum delay between successive packets addressed to the network address.

5. The method according to claim 4, wherein allocating the rate limiting circuit comprises causing the rate limiting circuit to apply the minimum delay to packets sent on multiple different transport service instances in the first network interface.

6. The method according to claim 4, wherein allocating the rate limiting circuit comprises assigning the rate limiting circuit to regulate a subset of the successive packets that are addressed to the network address and are associated with a given service level.

7. A network interface, comprising:
one or more transport service instances, which are configured to send communication packets over a network, and to receive from the network a notification that originates from a remote network node and indicates a network congestion encountered by one or more of the packets; and
congestion control circuitry, which is configured to identify, based on the notification, a network address of the remote network node, and to regulate responsively to the notification a transmission rate of subsequent packets that are addressed to the network address, irrespective of a transport service instance over which the subsequent packets are sent from the network interface,
wherein the notification indicates that the network congestion is encountered by the packets sent on a first transport service instance in the first network interface, and wherein the congestion control circuitry is configured to regulate the transmission rate of one or more subsequent packets that are addressed to the network address and are sent on a second transport service instance in the first network interface, different from the first transport service instance.

8. The network interface according to claim 7, wherein the congestion control circuitry is configured to initiate regulation of the transmission rate of the subsequent packets that are sent on a second transport service instance before receiving another notification of the network congestion encountered by the packets sent on the second transport service instance.

9. A network interface, comprising:
one or more transport service instances, which are configured to send communication packets over a network, and to receive from the network a notification that originates from a remote network node and indicates a network congestion encountered by one or more of the packets; and
congestion control circuitry, which is configured to identify, based on the notification, a network address of the remote network node, and to regulate responsively to the notification a transmission rate of subsequent packets that are addressed to the network address, irrespective of a transport service instance over which the subsequent packets are sent from the network interface,
wherein, on a given transport service instance, the congestion control circuitry is configured to regulate the transmission rate of the subsequent packets that are addressed to the network address, while refraining from regulating the transmission rate of the subsequent packets that are not addressed to the network address.

10. A network interface, comprising:
one or more transport service instances, which are configured to send communication packets over a network, and to receive from the network a notification that originates from a remote network node and indicates a network congestion encountered by one or more of the packets; and
congestion control circuitry, which is configured to identify, based on the notification, a network address of the remote network node, and to regulate responsively to the notification a transmission rate of subsequent packets that are addressed to the network address, irrespective of a transport service instance over which the subsequent packets are sent from the network interface,
wherein the congestion control circuitry comprises a pool of rate limiting circuits, and is configured to regulate the transmission rate by allocating a rate limiting circuit from the pool to force a minimum delay between successive packets addressed to the network address.

11. The network interface according to claim 10, wherein the rate limiting circuit is configured to apply the minimum delay to packets sent on multiple different transport service instances in the network interface.

12. The network interface according to claim 10, wherein the congestion control circuitry is configured to assign the rate limiting circuit to regulate a subset of the successive packets that are addressed to the network address and are associated with a given service level.

* * * * *